(12) United States Patent  
Downey

(10) Patent No.: US 6,557,809 B2
(45) Date of Patent: May 6, 2003

(54) UNIVERSAL SEAT TRACK ASSEMBLY

(75) Inventor: Hugh D. Downey, Barrie (CA)

(73) Assignee: Dura Global Technologies, Rochester Hills, MI (US)

( * ) Notice: Subject to any disclaimer, the term of this patent is extended or adjusted under 35 U.S.C. 154(b) by 0 days.

(21) Appl. No.: 10/087,123

(22) Filed: Mar. 1, 2002

(65) Prior Publication Data

US 2002/0130238 A1 Sep. 19, 2002

Related U.S. Application Data

(60) Provisional application No. 60/275,766, filed on Mar. 14, 2001.

(51) Int. Cl.[7] ............................................... F16M 13/00
(52) U.S. Cl. ......................................... 248/430; 384/46
(58) Field of Search .................. 248/430, 429, 248/424; 384/46, 47; 296/65.18, 65.05

(56) References Cited

U.S. PATENT DOCUMENTS

| 5,192,045 A | * | 3/1993 | Yamada et al. | ............. 248/430 |
|---|---|---|---|---|
| 5,222,814 A | * | 6/1993 | Boelryk | ....................... 248/430 |
| 5,855,350 A | | 1/1999 | Volker et al. | ................ 248/430 |
| 5,961,089 A | * | 10/1999 | Soisnard | ...................... 248/430 |
| 6,145,914 A | | 11/2000 | Downey et al. | .......... 296/65.18 |
| 6,427,962 B1 | * | 8/2002 | Rohee et al. | ................ 248/424 |

* cited by examiner

Primary Examiner—Ramon O. Ramirez
(74) Attorney, Agent, or Firm—Casimir R. Kiczek; Rick Mescher

(57) ABSTRACT

A seat track assembly includes a first track having a mounting wall and first and second spaced apart side walls extending from the mounting wall, and a second track having a base flange and first and second spaced apart side flanges extending from the base flange. The side walls and the side flanges each have a pair of flat surfaces which cooperate to define a pair of load transmission channels. The load transmission channels are preferably square-shaped and oriented at 45 degrees. Load transmission elements are positioned in the load transmission channels. At least one of the first and second tracks produce an interference with the load transmission elements so that at least one of the first and second tracks is resiliently deflected by the load transmission elements to bias the load transmission elements into engagement with each of the four flat surfaces.

25 Claims, 4 Drawing Sheets

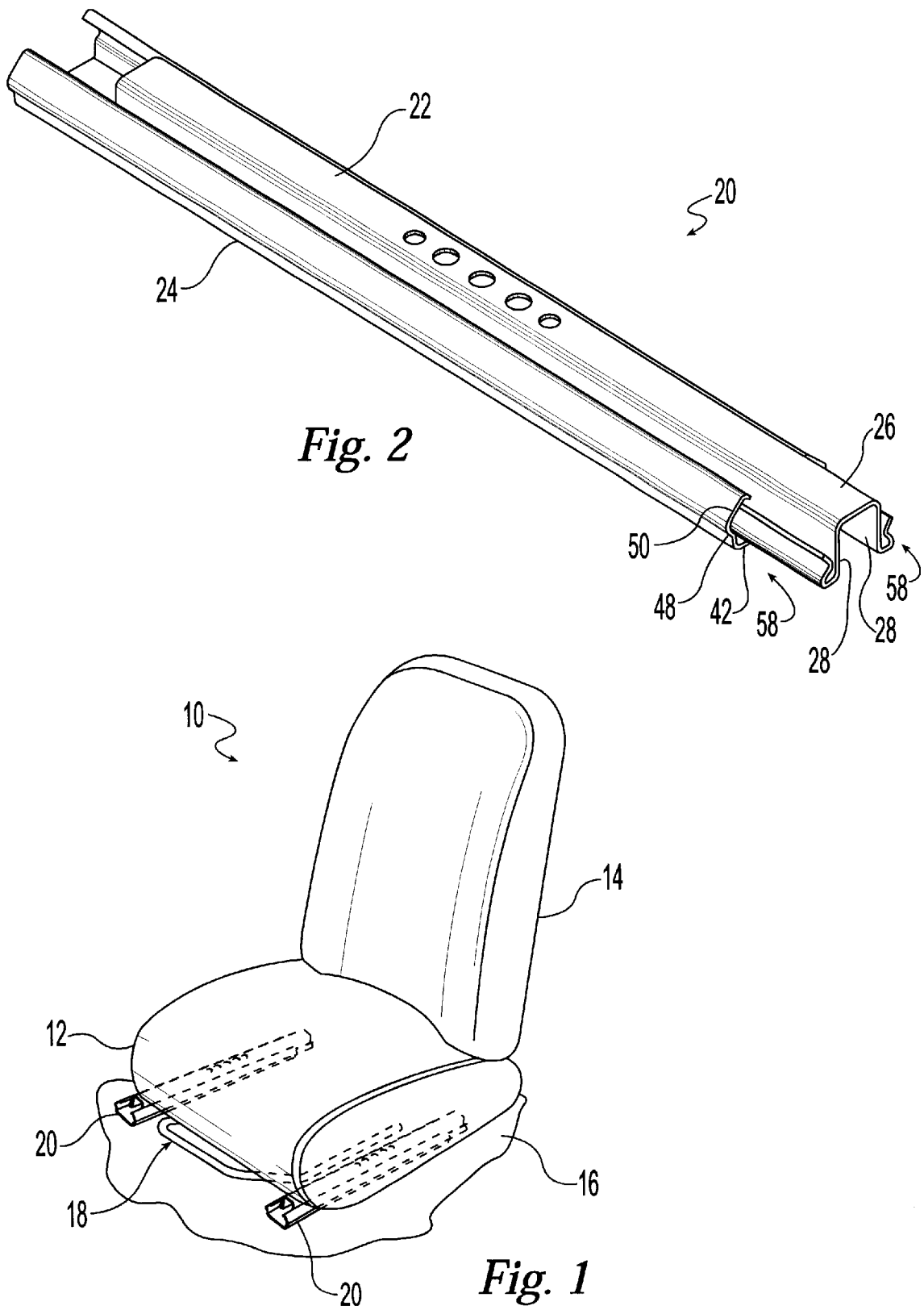

UNIVERSAL SEAT TRACK ASSEMBLY

CROSS-REFERENCE TO RELATED APPLICATIONS

This application claims the benefit of provisional patent application No. 60/275,766 filed Mar. 14, 2001.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to seat track assemblies allowing for adjustment of a seat with respect to a fixed member and, more particularly, to seat track assemblies suitable for adjusting the position of a seat with respect to a motor vehicle.

BACKGROUND OF THE INVENTION

Numerous seat track assemblies are used in the automotive industry to adjust the position of a seat in at least fore and aft directions with respect to a motor vehicle. Typically automotive seats have a seat back and a seat base, and the seat track assembly connects the seat base to a floor of the motor vehicle. U.S. Pat. No. 5,855,350 is owned by an affiliated corporation of the assignee of the present invention, and the disclosure of which is expressly incorporated herein in their entirety by reference, discloses an example of a so-called horizontal seat track assembly. In these kinds of seat track assemblies, the lateral stabilization ball bearing raceways are aligned so as to be generally parallel with the seat base and the floor of the motor vehicle. In such known horizontal seat track assemblies it has been desired to make the tracks more and more rigid to resist rattle, particularly when the seat track assembly is subject to a light load (e.g., when the seat is unoccupied). However, it has been found to be difficult to hold tolerances on the horizontal seat tracks when more rigid materials are used. This in turn makes it difficult to provide a raceway that maintains four point contact with ball bearings consistently along the travel path of the tracks. Other manufacturers sometimes have such difficulty holding tolerances on such tracks that they have to hold bearings of varying diameter in stock, make the tracks, then determine the size of the bearing raceway and insert bearings of the appropriate diameter.

U.S. Pat. No. 6,145,914, owned by the assignee of the present invention, and the disclosure of which is expressly incorporated herein in its entirety by reference, discloses an example of a so-called vertical seat track assembly. In these kinds of seat track assemblies, the load bearing elements are positioned vertically with respect to the seat base and the floor of the motor vehicle. The vertical seat track assemblies do not always function well when aligned horizontally. In some designs, the interlocking nature of the tracks (to help resist dislocation if the tracks are subjected to vertical dislocation forces) is uni-directional. That is, there is no interlocking feature to resist vertical dislocation if the tracks are positioned in the wrong orientation. It has become desirable to have a universal seat track assembly which can be positioned either horizontally or vertically, depending on the customer's space and packaging needs as well as other design requirements.

In view of the foregoing, it is an aspect of the present invention to provide a universal seat track assembly for use in a motor vehicle to provide for at least fore and aft adjustment of a seat of a motor vehicle, whether design constraints mandate a horizontal configuration or a vertical configuration. It is an additional aspect of the present invention to provide a seat track assembly which enhances manufacturability and which provides consistent low efforts for comfort adjustment of a motor vehicle seat. It is yet another aspect of the present invention to provide a seat track assembly that is highly reliable in operation.

SUMMARY OF THE INVENTION

In accordance with one aspect of the present invention, a seat track comprises, in combination, a first track having a mounting wall and first and second spaced-apart side walls extending along the mounting wall, and a second track movable relative to the first track and having a base flange and first and second spaced-apart side flanges extending along the base flange. The first side wall forms first and second surfaces, the first side flange forms third and fourth surfaces, and the first, second, third, and fourth surfaces cooperate to define a first load transmission channel. At least one first load transmission element is located within the first load transmission channel. At least one of the first track and the second track is configured to produce an interference between the at least one first load transmission element and at least one of the first track and the second track so that at least one of the first track and the second track is resiliently deflected by the at least one first transmission element to bias the at least one first load transmission element into engagement with each of the first, second, third, and fourth surfaces.

In accordance with another aspect of the present invention, a seat track assembly comprises, in combination, a first track having a mounting wall and first and second spaced apart side walls extending along the mounting wall, and a second track movable relative to the first track and having a base flange and first and second spaced apart side flanges extending along the base flange. The first side wall forms first and second flat surfaces, the first side flange forms third and fourth flat surfaces, and the first, second, third, and fourth flat surfaces cooperate to define a first load transmission channel. At least one first load transmission element is located within the first load transmission channel. At least one of the first track and the second track is configured to produce an interference between the at least one first load transmission element and at least one of the first track and the second track so that at least one of the first track and the second track. is resiliently deflected by the at least one first transmission element to bias the at least one first load transmission element into engagement with each of the first, second, third, and fourth flat surfaces. The second side wall forms fifth and sixth flat surfaces, the second side flange forms seventh and eighth flat surfaces, and the fifth, sixth, seventh, and eighth flat surfaces cooperate to define a second load transmission channel. At least one second load transmission element located within the second load transmission channel. At least one of the first track and the second track is configured to produce an interference between the at least one second load transmission element and at least one of the first track and the second track so that at least one of the first track and the second track is resiliently deflected by the at least one second transmission element to bias the at least one second load transmission element into engagement with each of the fifth, sixth, seventh, and eighth flat surfaces.

From the foregoing disclosure and the following more detailed description of various preferred embodiments it will be apparent to those skilled in the art that the present invention provides a significant advance in the technology and art of seat track assemblies. Particularly significant in this regard is the potential the invention affords for providing a high quality, reliable, low cost universal assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 1 is a perspective view of a vehicle seat assembly having seat track assemblies according to a preferred embodiment of the present invention;

FIG. 2 is a perspective view of a seat track assembly of the vehicle seat assembly of FIG. 1;

Figure 3:
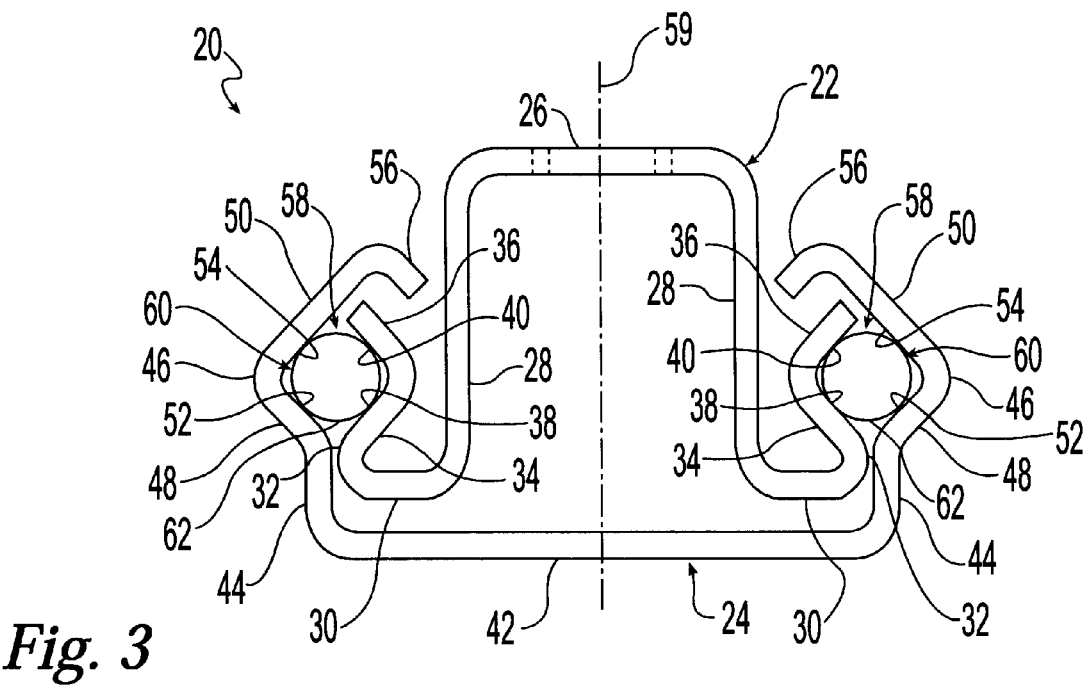
FIG. 3 is an end view of the seat track assembly of FIG. 2 wherein load transmitting elements of the seat track assembly are ball bearings.

It should be understood that the appended drawings are not necessarily to scale, presenting a somewhat simplified representation of various preferred features illustrative of the basic principles of the invention. The specific design features of a seat track assembly as disclosed herein, including, for example, specific dimensions, orientations, and shapes of the load transmission elements will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the seat track assembly illustrated in the drawings. In general, up or upward refers to an upward direction in the plane of the paper in FIGS. 3–8, and down or downward refers to a downward direction in the plane of the paper in FIGS. 3–8. Also in general, vertical refers to an upward/downward direction in the plane of the paper in FIGS. 3–8 and horizontal refers to a left/right direction in the plane of the paper in FIGS. 3–8.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved seat track assembly disclosed herein. The following detailed discussion of various alternative and preferred embodiments will illustrate the general principles of the invention with reference to a seat track assembly suitable for use in a motor vehicle seat such as an automobile seat. Other embodiments suitable for other applications will be apparent to those skilled in the art given the benefit of this disclosure.

Referring now to the drawings, FIG. 1 diagrammatically illustrates a vehicle seat assembly 10 mounted within a motor vehicle. The vehicle seat assembly 10 includes a seat base portion 12 and a seat back portion 14 upwardly extending at a rear edge of the seat base portion 12. The seat base portion 12 is mounted to the vehicle floor or frame 16 with an adjustable mounting assembly 18. The mounting assembly 18 includes a pair of parallel and laterally spaced apart seat track assemblies 20. Typically, one of the seat track assemblies 20 is positioned under one lateral side of the seat base portion 12 and the other of the seat track assemblies 20 is positioned under the opposite lateral side of the seat base portion 12. Because the track profiles of the seat track assemblies 20 are preferably identical, only one of the seat track assemblies 20 is described in detail hereinbelow.

As best shown in FIG. 2, each seat track assembly 20 includes first and second seat tracks 22, 24. One of the first and second seat tracks 22, 24 is fixed to the floor 16 of the motor vehicle and the other of the first and second seat tracks 22, 24 is fixed to the seat base portion 12. In the illustrated embodiment, the first seat track 22 is adapted to be affixed to the seat base portion 12, either directly or indirectly via risers, and the second seat track 24 is adapted to be fixed to the floor 16 of the motor vehicle, either directly or indirectly via risers. The forward/rearward position of the vehicle seat assembly 10 is adjusted by moving the first seat track 22 longitudinally, with seat base portion 12 attached thereto, over the second seat track 24 which is fixed in position relative to the vehicle floor 16. A locking device can be used to selectively hold and release the first seat track 22 with respect to the second track 24 at desired positions as is known in the art.

As best shown in FIG. 3, the first seat track 22 has a mounting wall 26 for attachment to the seat base portion 12, either directly or via upper risers. Generally parallel and spaced apart side walls 28 extend from opposite longitudinally extending edges of the mounting wall 26 at generally right angles to the mounting wall 26, that is, generally perpendicular to the mounting wall 26. The side walls 28 longitudinally extend the length of the mounting wall 26. Connecting webs 30 extend from the side walls 28, respectively, at longitudinal edges opposite the mounting wall 26. The connecting webs 30 longitudinally extend the length of the side walls 28. The connecting webs 30 are preferably generally perpendicular to the side walls 28. Side legs 32 extend from the connecting webs 30, respectively, at longitudinal edges opposite the side walls 28. The side legs 32 longitudinally extend the length of the connecting webs 30. The side legs 32 preferably have first and second leg portions 34, 36 which are generally perpendicular to each other. The first leg portions 34 are preferably provided with first flat contact surfaces 38 and the second leg portions 36 are preferably provided with second flat contact surfaces 40. Preferably, the first flat surfaces 38 are at generally right angles to, that is, perpendicular to the second flat surfaces 40.

The second seat track 24 is designed to be attached to the vehicle floor 16, either directly or through risers. The second seat rack 24 has a base flange 42 and a pair of generally parallel and spaced apart connecting flanges 44 extending from opposite longitudinally extending edges of the base flange 42 at generally right angles to the base flange 42, that is, generally perpendicular to the base flange 42. The connecting flanges 44 longitudinally extend the length of the base flange 42. Side flanges 46 extend from the base flange 42 at longitudinal edges of the connecting flange 44 opposite the base flange 42. The side flanges 46 preferably have first and second flange portions 48, 50 which are generally perpendicular to each other. The first flange portions 48 are preferably provided with first flat contact surfaces 52 and the second flange portions 50 are preferably provided with second flat contact surfaces 54. Preferably, the first flat surfaces 52 are at generally right angles to, that is, perpendicular to the second flat surfaces 54. Interlocking flanges 56 extend from the longitudinal edges of the side flanges 46 opposite the connecting flanges 44 to help resist dislocation of the first seat track 22 with respect to the second seat track 24 when subjected to vertical dislocation forces, that is forces perpendicular to the mounting wall 26 and the base flange 42. Other interlocking techniques, such as use of a separate component attached to either of the first and second seat tracks 22, 24, will be readily apparent to those skilled in the art given the benefit of this disclosure.

With the first seat track 22 positioned within the second seat track 24 of the illustrated embodiment, the mounting wall 26 and the connecting webs of the of the first seat track 22 is substantially parallel to the base flange of the second seat track 24. Additionally, the side walls 28 of the first seat track 22 are substantially parallel to the connecting flanges 44 of the second seat track 24. Most notably, however, the first flat contact surfaces 38 of the first seat track 22 are substantially parallel to the second flat contact surfaces 54 of the second seat track 24 and the second flat contact surfaces 40 of the first seat track 22 are substantially parallel to the first flat contact surfaces 52 of the second seat track 24. Arranged in this manner, the first and second flat contact surfaces 38, 40 of the side legs 32 cooperate with the first and second flat contact surfaces 52, 54 of the side flanges 46 to define a pair of longitudinally extending load transmission channels or passages 58. The load transmission channels 58 are preferably substantially rectangular-shaped in cross section and are more preferably substantially square-shaped in cross section as shown in FIG. 3. The illustrated load transmission channels 58 are laterally spaced apart equal distances from the central axis 59 of the first and second seat tracks 22, 24, are mirror images of one another about the central axis 59, and have the same orientation. The rectangular or square-shaped load transmission channels are preferably formed at angles relative to horizontal and vertical planes, that is, the flat contact surfaces 38, 40, 52, 54 are preferably formed at angles to both horizontal and vertical planes. The illustrated load transmission channels 58 each have 45 degree configurations or orientations wherein the flat contact surfaces 38, 40, 52 each form 45 degree angles to vertical and horizontal planes.

Load transmission elements 60 are positioned in each of the load transmission channels 58. The load transmission elements are designed to transfer load of the first seat track 22 (and everything secured to it, including the seat and any occupant of the seat) to the second seat track 24, to provide as little resistance as possible during position adjustment, and to provide lateral stabilization of the first and second seat tracks 22, 24. The load transmission elements 60 can be, for example, spherical rolling members such as ball bearings 62 (FIG. 3), cylindrical rolling members such as rollers 64 (FIGS. 4 and 5), and sliding members such as sliders 66 (FIG. 6), depending on customer preference with regards to sometimes competing design requirements. Other suitable load transmission elements 60 will be readily apparent to those skilled in the art given the benefit of this disclosure. It is noted that when the load transmission channels 58 are substantially square-shaped as illustrated, either ball bearings 62, rollers 64, or sliders 66 can be utilized in universal first and second seat tracks 22, 24 without modification thereto.

As shown in FIG. 3, there is preferably at least one ball bearing 62 and more preferably a plurality of ball bearings 62 located in each of the load transmission channels 58. Retainers can optionally hold a plurality of the ball bearings 62 in longitudinally spaced-apart locations along the load transmission channels 58. Each of the ball bearings 62 is preferably in contact with the first and second tracks 22, 24 at each of the flat contact surfaces 38, 40, 52, 54. In the illustrated embodiment, each of the ball bearings 62 has four contacts with the seat tracks 22, 24. The four contacts are generally equally-spaced about the circumference of the ball bearings 62, that is, the four contacts are spaced at about 90 degree increments about the circumference ball bearings 62. Each of the four contacts is a theoretical point contact with a sphere contacting a planar surface. The ball bearings 62 can be formed of any suitable material such as, for example, a plastic (Nylon for example) or a metal (steel for example).

Figure 4:
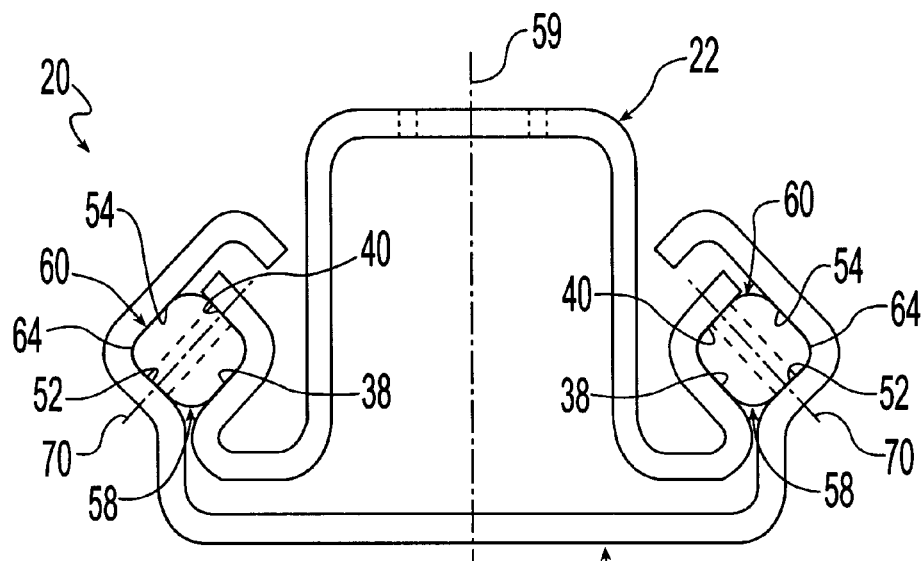
FIG. 4 is an end view of first alternative embodiment of the seat track assembly of FIG. 2 wherein the load transmitting elements are rollers.
Figure 5:
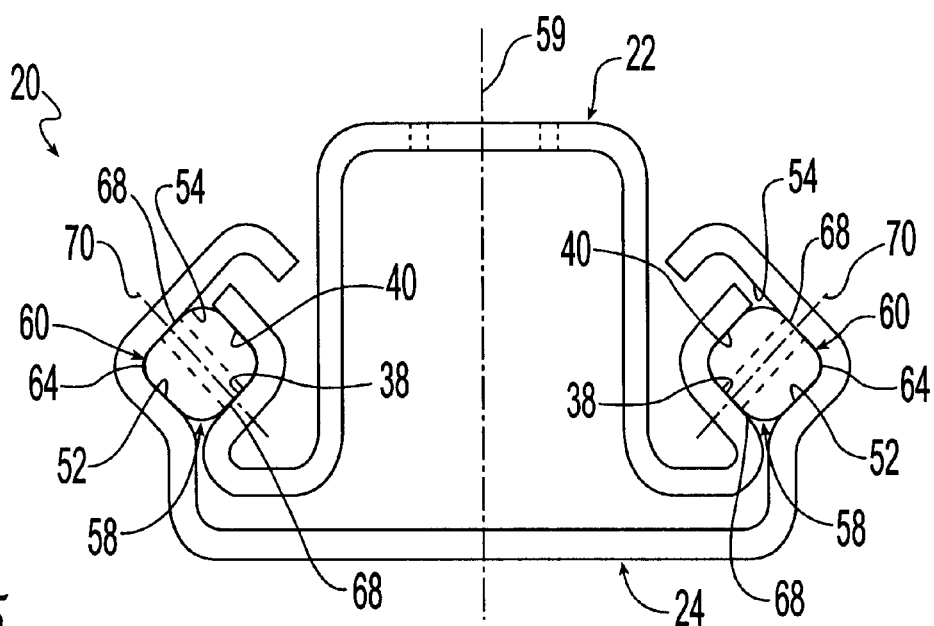
FIG. 5 is an end view of a variation of the first alternative embodiment of the seat track assembly of FIG. 4 wherein the rollers are mounted in different orientations.

As best shown in FIGS. 4 and 5, the load transmission elements 60 can alternatively be cylindrical rolling members such as rollers 64. There is preferably at least one roller 64 and more preferably a plurality of rollers 64 located in each of the load transmission channels 58. Retainers can optionally hold a plurality of the rollers 64 in longitudinally spaced-apart locations along the load transmission channels 58. Each of the rollers 64 is preferably in contact with the first and second tracks 22, 24 at each of the flat contact surfaces 38, 40, 52, 54. In the illustrated embodiment, each of the rollers 64 has four contacts with the seat tracks 22, 24. Two of the four contacts located at the opposite planar ends 68 of the rollers 64 while the other two of the four contacts are located at opposite longitudinal sides of the circular circumference of the rollers that is, spaced at about 180 degree increments about the circumference rollers 64. Each of the two contacts located at the ends of the rollers 64 is a theoretical sliding surface contact with a planar surface contacting a planar surface. Each of the two contacts located at the longitudinal sides of the rollers 64 is a theoretical line contact with a cylindrical surface contacting a planar surface. The rollers 64 can be formed of any suitable material such as, for example, plastic (Nylon for example) or metal (steel for example).

The rollers 64 pivot or rotate about a central longitudinal axis 70 as the first seat track 22 is adjusted with respect to the second seat track 24. The rollers 64 can be oriented in any suitable direction. The rollers 64 illustrated in FIG. 4 are oriented at right angles, or about 90 degrees, to the rollers 64 illustrated in FIG. 5. The rollers of FIG. 4 are inwardly inclined toward the first seat track, 22, that is, inclined such that the ends 68 of the rollers 64 contacting the first seat track 22 are closer to the mounting wall 26 than to the base flange 42. The rollers of FIG. 5 are outwardly inclined away the first seat track 22, that is, inclined such that the ends 68 of the rollers 64 contacting the first seat track 22 are closer to the base flange 42 than to the mounting wall 26.

Figure 6:
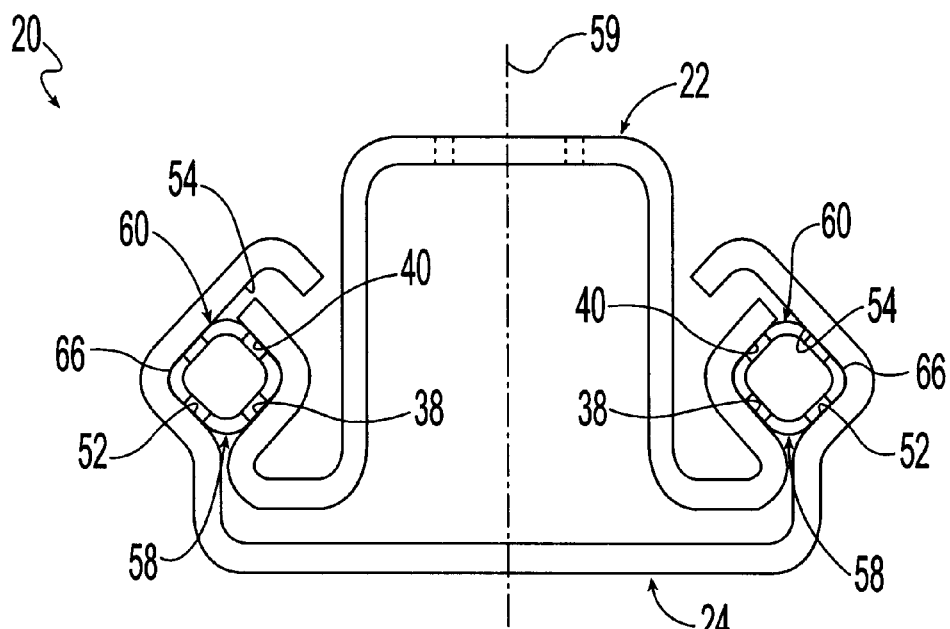
FIG. 6 is an end view of a second alternative embodiment of the seat track assembly of FIG. 2 wherein the load transmitting elements are sliders.

As best shown in FIG. 6, the load transmission elements 60 can alternatively be a sliding element such as sliders 66. There is preferably at least one slider 66 and more preferably a plurality of sliders 66 located in each of the load transmission channels 58. Retainers can optionally hold a plurality of the sliders 66 in longitudinally spaced-apart locations along the load transmission channels 58. Each of the sliders 66 is preferably in contact with the first and second tracks 22, 24 at each of the flat contact surfaces 38, 40, 52, 54. In the illustrated embodiment, each of the sliders 66 has four contacts with the seat tracks 22, 24. The four contacts are at the four sides of the rectangular shaped sliders 66. Each of the four contacts is a theoretical sliding surface contact with a planar surface contacting a planar surface. It is noted, however, that the surfaces of the sliders 66 can alternately take other forms which may produce point, line or other types of contact. The sliders 66 can be formed of any suitable material such as, for example, a plastic (Nylon for example) or a metal (steel for example). The sliders 66 are optionally provided with low friction surfaces at the contacts to help reduce efforts in seat track adjustment.

Figure 7:
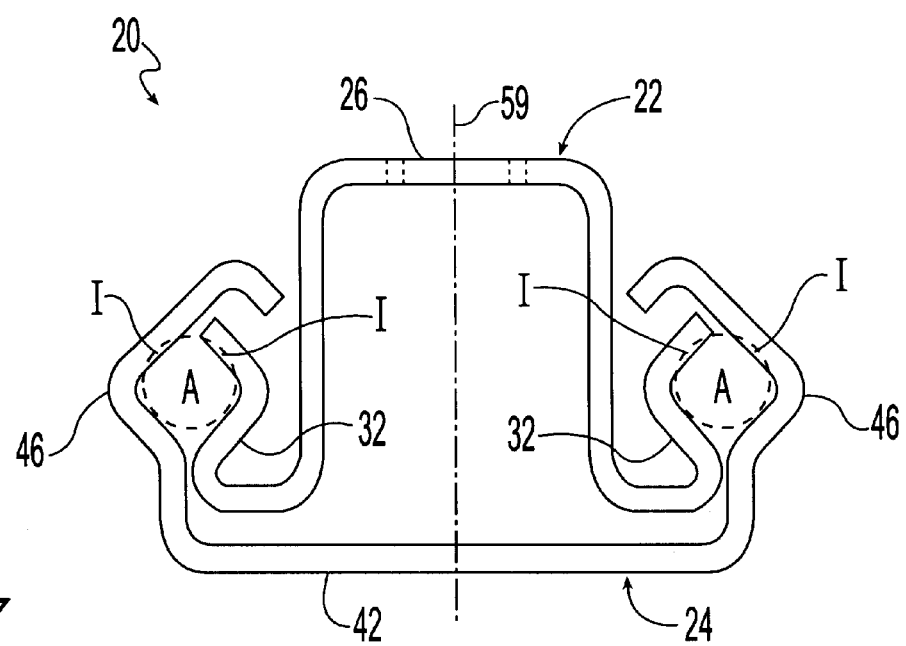
FIG. 7 is an end view of the seat track assembly of FIG. 2 prior to the insertion of load translation elements between the tracks and illustrating an interference for providing preload on the load transmission elements.

As best shown in FIG. 7, in accordance with a highly advantageous feature of the present invention, one or both of the first and second seat tracks 22, 24 may be configured to interfere with a cross sectional area A defined by the load transmission elements 60, such as the ball bearings 62. Configured in this manner there is an interference I created between the load transfer elements 60 and at least one of the first and second seat tracks 22, 24 so that at least one of the first and second seat tracks 22, 24 is resiliently deflected during assembly in order to assemble the load transmission elements between the first and second seat tracks 22, 24. As a result, the first and second seat tracks 22, 24 preload and/or bias the load transmission elements 60 into engagement with the four contact surfaces 38, 40, 52, 54 even when the seat track assembly 20 is in an unloaded condition. This preload is useful to avoid rattle during operation of the motor vehicle and/or seat, especially when the seat is subjected to no or light loading, such as when the seat is unoccupied.

As best shown in FIG. 3, it is preferable that the flat contact surfaces 38, 40, 52, 54 are formed at generally 45 degree angles with the floor 16 of the motor vehicle and with the illustrated mounting wall 26 and base flange 42, that is, at 45 degree angles with both horizontal and vertical planes. This 45 degree configuration of the flat contact surfaces 38, 40, 52, 54 advantageously allows the preloading of the tracks to avoid rattle without the need for producing a rigid assembly where the ball bearings 62, typically being formed of a harder material than the seat tracks 22, 24, may dent the seat tracks 22, 24.

In FIGS. 1–7, the first and second seat tracks 22, 24 are shown in a horizontal position, that is, a position wherein the longitudinal axes of the transmission channels 58 of a single seat track assembly 20 are within a horizontal plane generally parallel to the seat base portion 12 and/or the vehicle floor 16 and/or the central axis 59 is within a vertical plane. In this horizontal position, the illustrated mounting wall 26 of the first seat track 22 and the base flange 42 of the second seat track 24 are each generally horizontal and generally parallel to the seat base portion 12 and/or the vehicle floor 16. In accordance with a highly advantageous feature of the present invention, the first and second seat tracks 22, 24 may also be used in a vertical position, that is, a position wherein the longitudinal axes of the load transmission channels 58 of a single seat track assembly 20 are within a vertical plane generally perpendicular to the seat base portion 12 and/or the vehicle floor 16 and/or the central axis 59 is within a horizontal plane. In this vertical position, the illustrated mounting wall 26 of the first seat track 22 and the base flange 42 of the second seat track 24 are each generally vertical and generally perpendicular to the seat base portion 12 and/or the vehicle floor 16. The first and second seat tracks 22, 24 can be used in either the horizontal or vertical positions without modification.

Figure 8:
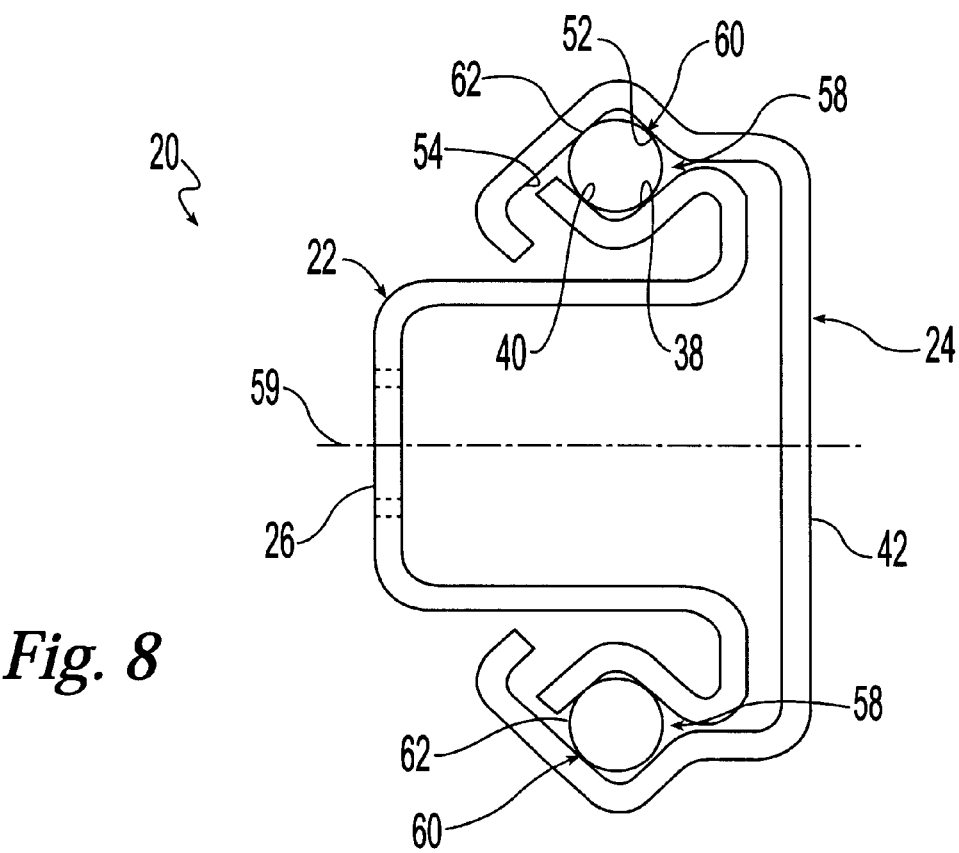
FIG. 8 is an end view of a third alternative embodiment of the seat track assembly of FIG. 2 wherein the tracks are oriented vertically rather than horizontally.

FIG. 8 illustrates the seat track assembly 20 in the vertical position. Because the illustrated flat contact surfaces 38, 40, 52, 54 are oriented at 45 degree angles to both the vertical and the horizontal planes, loading on the load transmission elements 60 is very similar in either the horizontal or the vertical alignment. Additionally, the contacts between the ball bearings 62 and the first and second seat tracks 22, 24 remain the same regardless of the position of the seat tracks, 22, 24. It is noted that while the load transmission elements 60 of FIG. 8 are illustrated to be ball bearings 62, any other kind of suitable load transmission elements 60 such as, for example, the rollers 64 (FIGS. 4 and 5) or the sliders 66 (FIG. 6) can be utilized when the seat tracks 22, 24 are oriented in the vertical position.

From the above disclosure and detailed description of certain preferred embodiments, it is apparent that the first and second seat tracks 22, 24 are universal because they can be used in either the horizontal or vertical positions without modification and can use different types of load transfer elements 60 without modification. Therefore, common seat tracks 22, 24 are produced to be used with different types of load transmission elements 60 and both vertical and horizontal applications.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A seat track assembly comprising, in combination:

a first track having a mounting wall and first and second spaced-apart side walls extending along the mounting wall;

a second track movable relative to the first track;

wherein the second track has a base flange and first and second spaced-apart side flanges extending along the base flange;

wherein the first side wall forms first and second surfaces, the first side flange forms third and fourth surfaces, and the first, second, third, and fourth surfaces cooperate to define a first load transmission channel; and at least one first load transmission element located within the first load transmission channel;

wherein at least one of the first track and the second track is configured to produce an interference between the at least one first load transmission element and at least one of the first track and the second track so that at least one of the first track and the second track is resiliently deflected during assembly by the at least one first transmission element to preload the at least one first load transmission element into engagement with each of the first, second, third, and fourth surfaces when the seat track assembly is in an unloaded condition.

2. The seat track assembly of claim 1, further comprising at least one second load transmission element located within a second load transmission channel, and wherein the second side wall forms fifth and sixth surfaces, the second side flange forms seventh and eighth surfaces, and the fifth, sixth, seventh, and eighth surfaces cooperate to define the second load transmission channel, and at least one of the first track and the second track is configured to produce an interference between the at least one second load transmission element and at least one of the first track and the second track so that at least one of the first track and the second track is resiliently deflected by the at least one second transmission element to bias the at least one second load transmission element into engagement with each of the fifth, sixth, seventh, and eighth surfaces.

3. The seat track assembly of claim 2, wherein the first, second, third, fourth, fifth, sixth, seventh, and eighth surfaces are each flat.

4. The seat track assembly of claim 2, wherein the first load transmission channel and the second load transmission channel are generally parallel and spaced apart in a horizontal plane.

5. The seat track assembly of claim 2, wherein the first load transmission channel and the second load transmission channel are generally parallel and spaced apart in a vertical plane.

6. The seat track assembly of claim 1, wherein the at least one first load transmission element is a ball bearing.

7. The seat track assembly of claim 1, wherein the at least one first load transmission element is a roller.

8. The seat track assembly of claim 1, wherein the at least one first load transmission element is a slider.

9. A seat track assembly comprising, in combination:
  a first track having a mounting wall and first and second spaced-apart side walls extending along the mounting wall;
  a second track movable relative to the first track;
  wherein the second track has a base flange and first and second spaced-apart side flanges extending along the base flange;
  wherein the first side wall forms first and second surfaces, the first side flange forms third and fourth surfaces, and the first, second, third, and fourth surfaces cooperate to define a first load transmission channel; and
  at least one first load transmission element located within the first load transmission channel;
  wherein at least one of the first track and the second track is configured to produce an interference between the at least one first load transmission element and at least one of the first track and the second track so that at least one of the first track and the second track is resiliently deflected by the at least one first transmission element to bias the at least one first load transmission element into engagement with each of the first, second, third, and fourth surfaces;
  wherein the first, second, third, and fourth surfaces are each flat.

10. The seat track assembly of claim 9, wherein the first, second, third and fourth surfaces each form an angle of less than 90 degrees with both vertical and horizontal planes.

11. The seat track assembly of claim 10, wherein the first, second, third and fourth surfaces each form an angle of about 45 degrees with both vertical and horizontal planes.

12. The seat track assembly of claim 9, wherein the first load transmission channel is generally rectangular-shaped in cross section.

13. The seat track assembly of claim 12, wherein the first load transmission channel is generally square-shaped in cross section.

14. The seat track assembly of claim 9, wherein the first and second surfaces are at about a right angle with respect to one another.

15. The seat track assembly of claim 14, wherein the second and third surfaces are at about a right angle with respect to one another.

16. The seat track assembly of claim 15, wherein the second and third surfaces are each at about a right angle with respect to one of the first and second surfaces and about parallel with the other of the first and second surfaces.

17. A seat track assembly comprising, in combination:
  a first track having a mounting wall and first and second spaced apart side walls extending along the mounting wall;
  a second track movable relative to the first track;
  wherein the second track has a base flange and first and second spaced apart side flanges extending along the base flange;
  wherein the first side wall forms first and second flat surfaces, the first side flange forms third and fourth flat surfaces, and the first, second, third, and fourth flat surfaces cooperate to define a first load transmission channel;
  at least one first load transmission element located within the first load transmission channel;
  wherein at least one of the first track and the second track is configured to produce an interference between the at least one first load transmission element and at least one of the first track and the second track so that at least one of the first track and the second track is resiliently deflected by the at least one first transmission element to bias the at least one first load transmission element into engagement with each of the first, second, third, and fourth flat surfaces;
  wherein the second side wall forms fifth and sixth flat surfaces, the second side flange forms seventh and eighth flat surfaces, and the fifth, sixth, seventh, and eighth flat surfaces cooperate to define a second load transmission channel; and
  at least one second load transmission element located within the second load transmission channel;
  wherein at least one of the first track and the second track is configured to produce an interference between the at least one second load transmission element and at least one of the first track and the second track so that at least one of the first track and the second track is resiliently deflected by the at least one second transmission element to bias the at least one second load transmission element into engagement with each of the fifth, sixth, seventh, and eighth flat surfaces.

18. The seat track assembly of claim 17, wherein the first load transmission channel and the second load transmission channel are generally parallel and spaced apart in a horizontal plane.

19. The seat track assembly of claim 17, wherein the first load transmission channel and the second load transmission channel are generally parallel and spaced apart in a vertical plane.

20. The seat track assembly of claim 17, wherein the first and second load transmission channels are each generally square-shaped in cross section.

21. The seat track assembly of claim 20, wherein the first, second, third, fourth, fifth, sixth, seventh, and eighth flat surfaces each form an angle of less than 90 degrees with both vertical and horizontal planes.

22. The seat track assembly of claim 21, wherein the first, second, third, fourth, fifth, sixth, seventh, and eighth flat surfaces each form an angle of about 45 degrees with both vertical and horizontal planes.

23. The seat track assembly of claim 17, wherein the at least one first load transmission element is a first ball bearing and the at least one second load transmission element is a second ball bearing.

24. The seat track assembly of claim 17, wherein the at least one first load transmission element is a first roller and the at least one second load transmission element is a second roller.

25. The seat track assembly of claim 17, wherein the at least one first load transmission element is a first slider and the at least one first load transmission element is a second slider.

* * * * *